May 24, 1932.  S. J. VAN DEN BERGH  1,859,725

FIRE CONTROL APPARATUS

Filed July 19, 1926    3 Sheets-Sheet 1

Inventor:
S. J. van den Bergh

May 24, 1932. S. J. VAN DEN BERGH 1,859,725
FIRE CONTROL APPARATUS
Filed July 19, 1926  3 Sheets-Sheet 3

Inventor:
S. J. van den Bergh

Patented May 24, 1932

1,859,725

UNITED STATES PATENT OFFICE

SAMUEL JOHANNES VAN DEN BERGH, OF THE HAGUE, NETHERLANDS, ASSIGNOR TO THE FIRM N. V. NEDERLANDSCHE INSTRUMENTEN-COMPAGNIE, OF THE HAGUE, NETHERLANDS

FIRE CONTROL APPARATUS

Application filed July 19, 1926, Serial No. 123,515, and in Germany July 20, 1925.

The present invention relates to a fire control apparatus which is either disposed on a fixed or a movable base and which is provided, for ascertaining the velocity of an aircraft relatively to the said base, with a sighting device for following up the aircraft in elevation and azimuth with a device for ascertaining the horizontal projection of the distance and with two speed indicators which (by multiplication gear or the like) are so coupled to the said two devices that the one indicates the component, falling into the direction of the horizontal projection of the sighting line of the sighting device, and the other the horizontal component, perpendicular to this component, of the velocity to be ascertained.

According to the present invention to each of the two speed indicators appertains a following mechanism and a device for transforming the co-ordinates coupled to the two following mechanisms which furnishes the horizontal projection of the required velocity from these two components.

If in a fire control apparatus of this kind it be desired to predetermine also the height of the hitting point, i. e. that point, at which a projectile, fired under proper conditions at an aircraft, ought to hit this aircraft it is advisable to provide a third speed indicator which is so coupled to an actuating device adjustable according to the variations of the height of flight of the aircraft as to be capable of indicating the vertical component of the velocity of the aircraft.

Moreover it is suitable to provide multiplication device by means of which it is possible to obtain the product of the component of velocity, shown on this speed indicator, and of the time of flight increased by the lag; the lag means the time which elapses after the close of the observation until the firing of the projectile, and the time of flight that time which the projectile requires from the firing in order to reach the hitting point.

Figure 1:
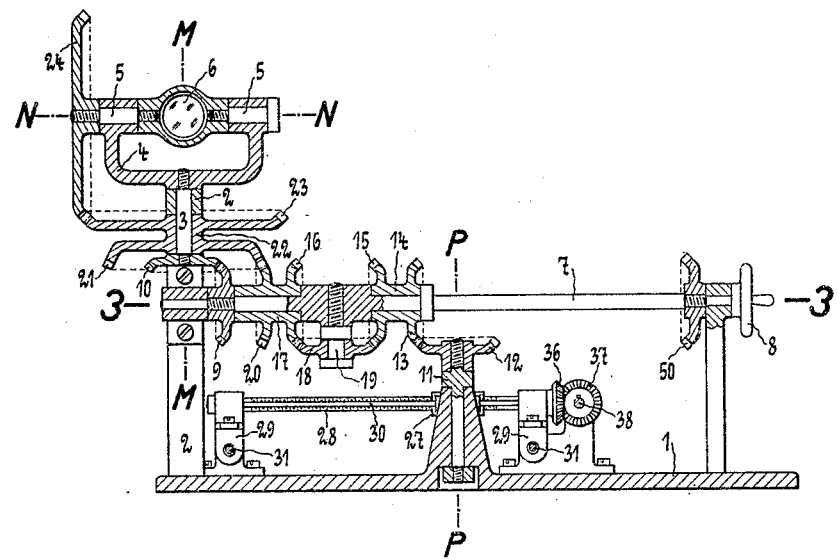
Figure 2:
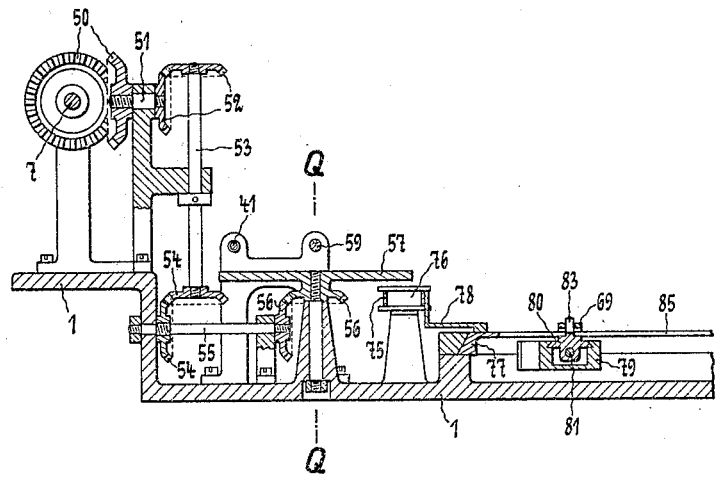
Figure 3:
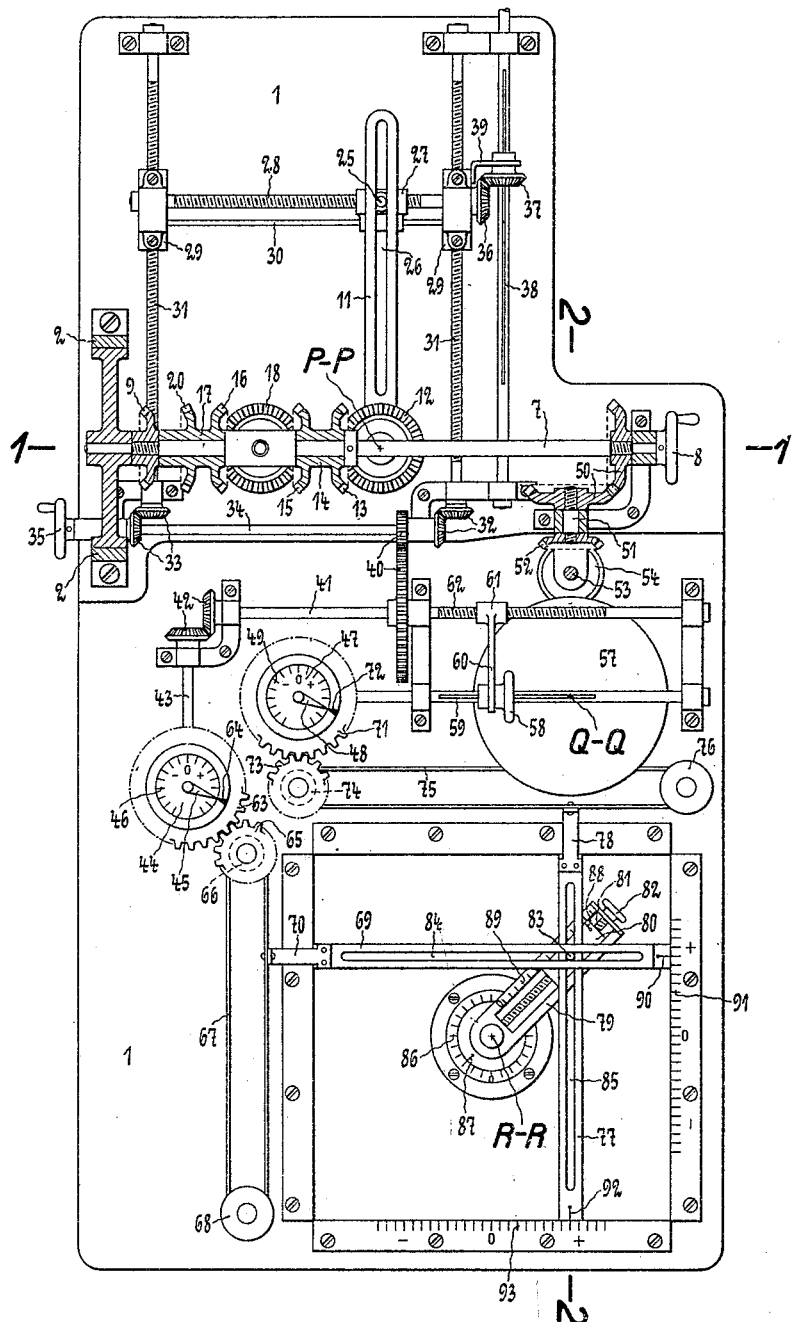
Figure 4:
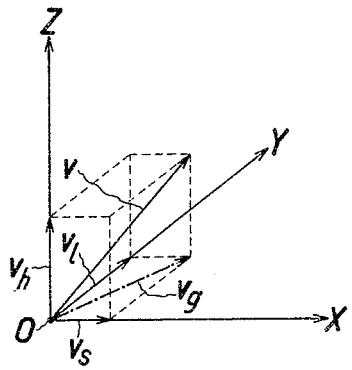
Figure 5:
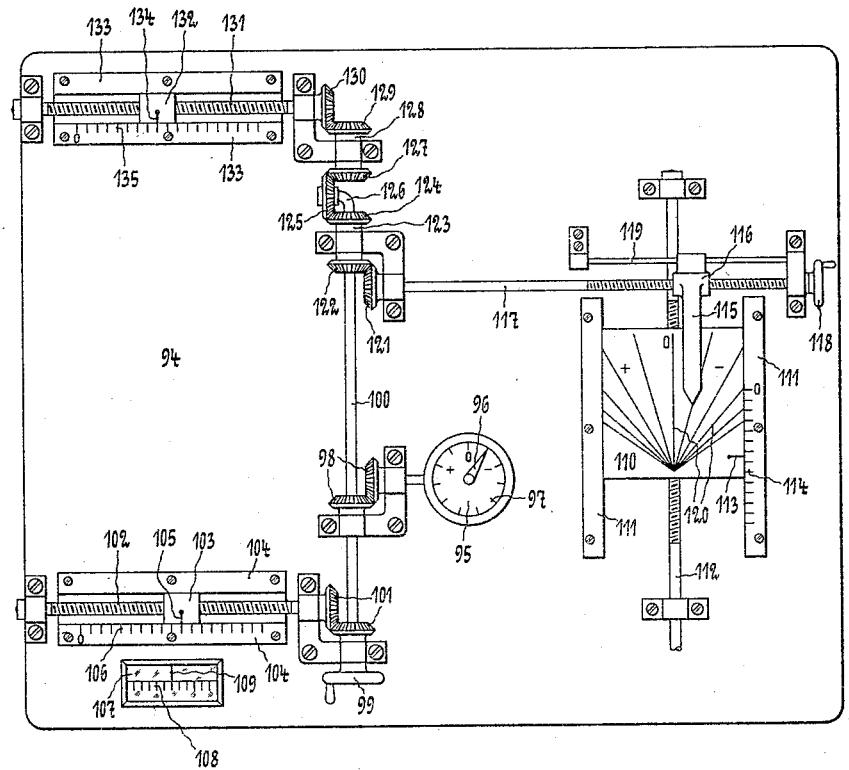

The accompanying drawings show a constructional example of the invention. Figs. 1 to 3 illustrate a device, constructed according to the present invention, for ascertaining the velocity of an aircraft over ground; Fig. 1 is an elevation, Fig. 2 a side elevation and Fig. 3 a plan. Fig. 4 shows the appertaining diagram of the velocities. Fig. 5 shows in a plan a device according to the present invention for predetermining the height of the hitting point when firing at an aircraft.

Let an aircraft be assumed to move (see Fig. 4) from a point O at a velocity $v$. Let it be assumed that through O is placed a rectangular, three dimensional co-ordinate system with the axes OX, OY and OZ whose Z-axis is vertical and whose Y-axis represents the horizontal projection of the sighting line from the location of the device towards the aircraft. Hence, the co-ordinate system is assumed to be moving along with the aircraft in such a way that its vertical Y Z-plane permanently contains the sighting line towards the aircraft. By projecting the velocity $v$ into the X Y-plane one obtains the velocity of the aircraft over ground $v_g$ whose components are denoted in the X-direction and in the Y-direction by $v_s$ and $v_l$. By $v_h$ is represented the vertical component of the velocity $v$.

In the device shown in Figs. 1 to 3 it is the question of first determining separately the components $v_s$ and $v_l$ and of ascertaining therefrom the resultant velocity $v_g$ over ground. The device contains a base plate 1, to which is screwed a necklike bearing 2 in which there is supported by means of a pivot 3 a fork 4 rotatable about a vertical axis M—M. In the fork 4 is supported by means of two pivots 5 a sighting telescope 6 rotatable about a horizontal axis N—N. Rotations of the fork 4, and thereby of the telescope 6 about the axis M—M are produced by rotations of a hand wheel 8 of a shaft 7 provided with a bevel wheel 9, engaging in a bevel wheel 10 fixed on the pivot 3.

Rotations of the telescope 6 about the axis N—N are produced by rotations of an arm 11 which is supported on the base plate 1, rotatable about an axis P—P parallel to the axis M—M. To the arm 11 there is rigidly connected a bevel-wheel 12 which engages in a bevel gearing 13 of a wheel body 14 rotatably supported on the shaft 7. A second bevel gearing 15 of this wheel body 14 forms the one crown wheel of a differential gear whose other crown wheel is formed by a bevel gearing 16 of a wheel body 17 also rotatably supported on the shaft 7, while the appertaining planet wheel 18 is disposed loosely rotatable about a pivot 19 which is so fixed on the shaft 7 that its axis perpendicularly intersects that of the shaft 7. A second bevel gearing 20 of the wheel body 17 engages in a bevel gearing 21 of a wheel body 22 which is rotatably supported on the pivot 3 and has a bevel gear 23 which engages in a bevel wheel 24 fixed on the one of the two pivots 5 of the telescope 6. The above described arrangement has for its object to prevent the inclination of the sighting line of the telescope to the horizontal plane from being affected by rotation of the telescope about the axis M—M.

Rotations of the arm 11 which, as just described, entail a displacement of the telescope in elevation (rotations about the axis N—N) are brought about by displacing a nut-piece 27, engaging by means of a pivot 25 in a longitudinal slot 26 of the arm 11 in two directions perpendicular to each other. In order to attain this, the nut-piece 27 is supported on a screw-spindle 28, parallel to the shaft 7 and rotatably supported on two additional nut-pieces 29. In order to be protected against rotations the nut-piece 27 engages in a guide rod 30, which is parallel to the spindle 28 and carried by the nut-pieces 29. The latter rest upon two screw-spindles 31, rotatably supported on the base plate 1 and being both perpendicular to a plane which is determined by the axis of the shaft 7 and the axis of rotation P—P of the arm 11. The two spindles 31 are actuated by means of two pairs of bevel wheels 32 and 33 from a shaft 34 which is parallel to the shaft 7 and can be actuated by a hand wheel 35. The component of each distance of the pivot 25 from the axis of rotation P—P of the arm 11, which is falling in the direction of the spindles 31, corresponds to the horizontal projection of the distance between the aircraft the telescope 6 aims at and the location of the device. The actuation of the screw-spindle 28 takes place by means of a bevel wheel 36 fixed on this spindle and of a bevel wheel 37, engaging in the bevel wheel 36, from a grooved shaft 38 along which the bevel wheel 37 is displaceable. Thereby a stud 39 acts in such a way that in each position of the two nut-pieces 29 the bevel wheel 37 is kept in mesh with the bevel wheel 36. The shaft 38 is rotatably supported on the base plate 1 in such a way as to be parallel to the spindles 31 and assumed to be so coupled to a measuring device for continuously ascertaining the height of an aircraft that, when the height is zero, the arm 11 is in the position shown in Fig. 3. When the arm 11 has a position deviating from the zero-position, which is indicated in Fig. 3, and, consequently, is inclined towards the spindles 31, the pivot 25 has such a position that its distance from its zero-position (which latter is shown in the drawing) is in correspondence with the altitude of the aircraft aimed at by the telescope 6.

The shaft 34 is coupled by means of a pair of toothed wheels 40, a shaft 41, a pair of bevel wheels 42 and a shaft 43 to a speed indicator 44 in such a way that, on the hand wheel 35 being rotated counter-clockwise, hence on the screw spindle 28 being removed from the shaft 34, (in correspondence with the horizontal projection of the distance between the aircraft and the location of the device) an index 45 of the speed indicator 44 shows a positive value on a circular scale 46 numbered according to velocities. Thereby the deflection at any one time of the index 45 from its zero position is proportional to the variation of the distance of the screw spindle 28 from the shaft 34 in the unit of time. When the altimeter is working correctly, which instrument is to be regarded as being coupled with the shaft 38, and the hand wheels 8 and 35 are adjusted in such a way that the telescope 6 permanently aims at an aircraft, the angular velocity of the shaft 34 is a measure for the alteration of the horizontal distance of the aircraft from the location of the device in the unit of time. As the speed indicator 44 is coupled with the shaft 34, also the deflection in each instance of its index 45 is a measure for this alteration. Taking into consideration that the said alteration is equivalent to the component of velocity $v_1$ (see the above explanations re Fig. 4), also the deflection in each instance of the index 45 is a measure for $v_1$.

A second speed indicator 47, containing an index 48 and a circular scale 49 numbered according to velocities, is used for indicating the component of velocity $v_s$ (see the above explanations re Fig. 4), which practically agrees with the product of the horizontal projection at any one time of the distance of the aircraft from the location of the device and the angular velocity at which, when following up the aircraft by means of the telescope 6, its sighting line rotates laterally. As, on the one hand, owing to the above described construction the component, falling into the direction of the screw-spindles 31, of the distance of the pivot 25 from the axis of rotation P—P of the arm 11 is proportional to the said horizontal projection and as, on the other hand, the rotation of the shaft 7 is proportional to the lateral rotation of the sighting line, the component of velocity $v_s$ is practically proportional to the product of the said component and the angular velocity at which the shaft 7 rotates. In order to form this product the following arrangement has been made. From the shaft 7 there is actuated a friction disc 57 by means of a pair of bevel wheels 50, a pivot 51, a pair of bevel wheels 52, a shaft 53, a pair of bevel wheels 54 (see Fig. 2), a shaft 55 and a pair of bevel wheels 56, the said disc 57 being supported rotatable on the base plate 1 about an axis Q—Q parallel to the shaft M—M. With this friction disc 57 coacts a friction wheel 58 displaceably disposed on a grooved shaft 59 which actuates the speed indicator 47. The angular velocity of the shaft 59 and thereby the amount of motion of the index 48 of this speed indicator 47 from its zero position depends on the one hand on the angular velocity of the friction disc 57 and on the other hand on the distance of the friction disc 58 from the centre of the friction disc 57. A positive value is indicated if the telescope undergoes a clockwise, lateral rotation. The distance of the friction disc 58 from the centre of the friction disc 57 is adjusted by a stud 60, acting on the friction disc and engaging by means of a nut-piece 61 in a thread 62 of the shaft 41. Thereby the arrangement is such that to the value zero of this distance there corresponds the value zero of the component, falling into the direction of the screw-spindles 31, of the distance of the pivot 25 from the axis of rotation P—P of the arm 11.

In order to form the resultant velocity over ground $v_g$ of the aircraft from the two components of velocity $v_1$ and $v_s$, indicated on the speed indicators 44 and 47, the following arrangement has been made. On the speed indicator 44 there is rotatably supported concentric with the scale 46 a toothed wheel 63 which is provided with a radial following mechanism 64. This wheel 63 engages in a gearing 65 of a disc 66 over which runs an endless band 67 which further rests upon a second disc 68. The discs 66 and 68 are so positioned that the plane, determined by their axes of rotation, is parallel to the screw-spindles 31. On the band 67 there is fixed by means of a stud 70 a sliding carriage 69, displaceably supported on the base-plate 1 for movement in the direction of the screw-spindles 31, so that motions of the band 67 cause an equal displacement of the sliding carriage 69. Moreover, there is rotatably supported on the speed indicator 47, concentric with the scale 49, a toothed wheel 71 which is provided with a radially directed following mechanism 72. This wheel 71 engages in a gearing 73 of a disc 74 over which runs an endless band 75 which further rests on a second disc 76. The discs 74 and 76 are so positioned that the plane, determined by their axes of rotation, is parallel to the shaft 7. On the band 75 there is fixed by means of a stud 78 a sliding carriage 77, displaceably supported on the base plate 1 in the direction of the shaft 7, so that motions of the band 75 cause an equal displacement of the sliding carriage 77. On the base plate 1 there is furthermore supported an arm 79 rotatable about an axis R—R, parallel to the axis M—M, on which arm is disposed displaceable in the radial direction a slide 80, engaging in a screw-spindle 81, rotatably supported on the arm 79 and capable of being actuated by means of a hand wheel 82. This slide 80 engages by means of a pivot 83 in a longitudinal groove 84 of the sliding carriage 69 and in a longitudinal groove 85 of the sliding carriage 77. On a scale 86 of the base plate 1 an index 87 of the arm 79 indicates the position of the arm relatively to the base plate 1, which position corresponds to the direction of the resultant velocity $v_g$. An index 88 of the slide 80 indicates on a scale 89 of the arm 79 the distance of the pivot 83 from the axis of rotation R—R of the arm, corresponding to the amount of the velocity $v_g$. Thereby the arrangement is such that, on the one hand, to the zero position of the sliding carriage 69 in which the component, falling into the direction of the screw-spindles 31, of this distance has the value zero, which may be read off on a scale 91 of the base plate 1 by means of an index 90 of the sliding carriage 69, there corresponds that position of the following mechanism 64 in which it is opposite the zero point of the scale 46, and that, on the other hand, to the zero position of the sliding carriage 77, in which the component, falling into the direction of the shaft 7, of the said distance has the value zero, which may be read off on a scale 93 of the base plate 1 by means of an index 92 of the sliding carriage 77 there corresponds that position of the following mechanism 72 in which it is opposite the zero point of the scale 49.

When using the telescope 6 it should be directed, by rotating the hand wheels 8 and 35 and by simultaneously actuating the altimeter, assumed to be coupled to the shaft 38, upon the aircraft whose velocity over ground $v_g$ is to be ascertained. The indices 45 and 48 of the speed indicators 44 and 47 then turn corresponding to the components $v_1$ and $v_s$ of this velocity $v_g$. In the above described device it is supposed that the direction of the course of the aircraft has been ascertained before by means of any well known special device. If the arm 79, by rotating it about its axis of rotation R—R, be adjusted in such a way that its index 87 shows on the appertaining scale 86 this well-known direction, it will only be necessary by rotating the hand wheel 82 to so adjust the slide 80 along the arm 79 that each of the two following mechanisms 64 and 72 is opposite the appertaining index of the speed indicator. The index 88 of the slide 80 then indicates on the appertaining scale 89 the velocity $v_g$ sought for according to its magnitude. If the direction according to which the arm 79 has been adjusted had not been ascertained quite correctly the following mechanisms 64 and 72 at no position of the slide 80 are exactly opposite the appertaining indexes. In this case the arm 79 and the slide 80 are to be further adjusted until the mechanisms 64 and 72 have their exact position. If the said supposition be not made, the adjustment of the following mechanisms 64 and 72 by displacing the arm 79 and the slide 80 would entail difficulties. It would in this case be advisable to modify the construction in such a way that the spindle 81 for actuating the slide 80 is dispensed with. When using the apparatus the following mechanisms 64 and 72 would have to be directly adjusted by actuating the discs 68 and 76.

The device illustrated in Fig. 5 for predetermining the height of the hitting point when firing at an aircraft contains a speed indicator 95, fixed on a base plate 94 and provided with a rotatable index 96 and a circular scale 97, numbered according to m/sec. The speed indicator is destined to indicate the component of velocity $v_h$ (see the above explanations re Fig. 4), viz, the increase or decrease of the height of an aircraft in the unit of time. The speed indicator 95 is coupled by means of a pair of bevel wheels 98, a shaft 100 actuated by a hand wheel 99, a pair of bevel wheels 101 and a screw-spindle 102 to a nut-piece 103, displaceably disposed along two guide bars 104 parallel to these spindles so that a displacement of the nut-piece effected by rotating the hand wheel 99 entails a deflection of the index 96 of the speed indicator 95 from its zero position in which it shows on the scale 97 the velocity zero. An index 105 of the nut-piece 103 shows on a scale 106, numbered according to heights, the position at any one time of the nut-piece relatively to the base plate 94, and the division of the scale is so chosen that with a uniform alteration of the height the difference of the values, indicated on it at the close and at the outset of the unit of time, is equal to the value shown on the speed indicator 95. In order to indicate to the operator the height of the aircraft, ascertained with the aid of a special altimeter (not shown) and according to which the nut-piece 103 must be adjusted, a window 107 is provided in which moves a height-scale 108, assumed to be actuated by this altimeter, opposite a fixed index 109.

In order to obtain from the height of the aircraft indicated with correct adjustment on the scale 106, the height of the hitting point, it is necessary to form the algebraic sum of the said height measured and that alteration of height which the aircraft undergoes during the time of flight, increased by the lag. This alteration of elevation is equal to the product of the vertical component $v_h$ of the velocity of the aircraft (i. e. the alteration of the height of flight in the unit of time) and of the time of flight of the projectile increased by the lag.

In order to form this product the following arrangement has been made. A curve-table 110 is displaceably disposed between two guide bars 111 in the direction of the shaft 100 and assumed to be coupled by means of a screw-spindle 112 (which is assumed to engage in a nut-piece of the curve-table) to a device (not shown), which furnishes the total of the lag and the time of flight of the projectile, so as to undergo displacements proportional to alterations of this total of time. An index 113 of the curve-table 110 shows on a scale 114 of the one guide bar 111 the total of time according to which the curve-table is adjusted at any one time. An index 115 is adjustable relatively to the curve-table 110 perpendicular to the guide bars 111. For this purpose it engages with a nut-piece 116 in a screw-spindle 117 which may be actuated by a hand wheel 118. In order to be protected against rotations about the axis of the spindle 117 the index is further straight line-guided along a shaft 119 parallel to the spindle 117. On the curve-table 110 there are traced curves 120 numbered according to m/sec in such a way that in each position of the curve-table the distance of the index 115 set to a certain definite curve from its zero position, in which the index is set to the curve corresponding to the velocity zero, corresponds to the product of the total of time, appertaining to the respective position of the curve-table, and to the velocity according to which the respective curve is figured.

The rotations of the spindle 117 are transmitted by means of a bevel wheel 121, fixed on the spindle, to a gearing 122 of a wheel body 123 which is rotatably supported on the shaft 100. A second gearing 124 of this wheel body forms the one crown wheel of a differential gear whose planet wheel 125 is freely rotatable on the one rectangularly curved end 126 of the shaft 100, while the second crown wheel is formed by a gearing 127 of a wheel body 128 which is supported on the base plate 94 rotatable about an axis, coinciding with that of the shaft 100. A second gearing 129 of this wheel body engages in a bevel wheel 130 resting upon a screw-spindle 131, which is supported on the base plate 94 rotatable about an axis parallel to the spindle 102. On the spindle 131 rests a nut-piece 132 which is slide-guided on the base plate 94 between two guide bars 133 parallel to the spindle 131 and which contains an index 134, indicating on a scale 135 of the one guide bar 133 the position at any one time of the nut-piece 132 relatively to the base plate 94. Thereby the arrangement is such that if the index 115 assumes that position relatively to the curve-table 110 in which it indicates the velocity zero, the index 134 shows on the scale 135 the same height as the index 105 on the scale 106.

When using the apparatus it is necessary to adjust, by rotating the hand wheel 99, the nut-piece 103 in such a way that the index 105 shows on the scale 106 the same height as the index 109 on the scale 108. In case of uniform alteration of this height the speed indicator 95 shows the velocity corresponding to the alteration of the height. The speed indicator must be continuously observed by a second observer and the index 115 is to be set, by rotating the hand wheel 118, to the velocity indicated on the speed indicator. If this velocity be equal to zero, i. e. if the height measured and indicated on the scale 108 remains the same, the height of the hitting point to be ascertained coincides with the height measured. The observer operating the hand wheel 99 is also able to adjust the speed indicator 95, independent of the indicating device 108, 109, to any desired vertical velocity estimated by him, which, for instance, may be useful if with great alterations of the height the altimeter is not immediately able to indicate the correct height.

I claim:

Device for ascertaining the horizontal velocity of an aircraft, containing a sighting device which, for the purpose of following up the aircraft in elevation and azimuth, is so mounted on a base plate that it allows of being turned about a vertical and a horizontal axis, a cross slide system containing two slides whereof one is displaceably mounted on the said base plate and the other is mounted on the first slide in such a manner that it can be displaced perpendicularly to the direction of displacement of this slide, an arm being rotatable on the base plate and about an axis perpendicular to the plane determined by the directions of displacement of the said two slides, means for so coupling the said arm to the said other slide that a displacement of the two slides causes the arm to rotate about the said axis, means for so coupling the said arm to the sighting device that a rotation of the arm causes the said sighting device to turn about its horizontal axis of rotation, further means for displacing the said other slide in correspondence with the altitude of the aircraft, a speed indicator coupled to the said first slide and being provided with a pointer for indicating the velocity of displacement of this slide, a multiplication device coupled to the said sighting device and to the said first slide in such a manner that one of its parts is caused to move with a velocity proportional to the product of the angular velocity of the sighting device about its vertical axis of rotation and of the distance of the said first slide from its zero position in which the point in which the said arm engages the said other slide lies in a plane which contains the axis of rotation of the said arm and is parallel to the direction of displacement of the said other slide, another speed indicator coupled to the said part and being provided with a pointer for indicating the velocity of the movement of this part, each of the said two speed indicators being provided with a following pointer adjustably arranged in such a manner that it can be kept in coincidence with the pointer of the respective speed indicator, a device for determining a vector by means of two components which are perpendicular to each other, this device containing two carriage-guides directed perpendicularly to each other, two sliding carriages displaceably supported in these guides, an arm supported rotatably about an axis perpendicular to the directions of displacement of the two sliding carriages, a slide displaceable along this arm, the slide engaging in the two sliding carriages, and means adapted to couple each of the two sliding carriages to one of the said two following pointers.

SAMUEL JOHANNES van den BERGH.